(12) United States Patent
Demma et al.

(10) Patent No.: US 8,616,316 B2
(45) Date of Patent: Dec. 31, 2013

(54) FORWARD STRUCTURE OF A MOTOR VEHICLE

(75) Inventors: Dino Demma, Ruesselsheim (DE); Frank Leopold, Taunusstein-Orlen (DE)

(73) Assignee: GM Global Technology Operations LLC, Detroit, MI (US)

( * ) Notice: Subject to any disclaimer, the term of this patent is extended or adjusted under 35 U.S.C. 154(b) by 271 days.

(21) Appl. No.: 13/040,539

(22) Filed: Mar. 4, 2011

(65) Prior Publication Data

US 2011/0215616 A1 Sep. 8, 2011

(30) Foreign Application Priority Data

Mar. 5, 2010 (DE) .................. 10 2010 010 398

(51) Int. Cl.
*B60K 11/04* (2006.01)

(52) U.S. Cl.
CPC .................................... *B60K 11/04* (2013.01)
USPC ........................................ 180/68.4; 165/41

(58) Field of Classification Search
CPC ...................................................... B60K 11/04
USPC ................... 180/68.4, 68.1, 68.2; 165/41
See application file for complete search history.

(56) References Cited

U.S. PATENT DOCUMENTS

| | | | |
|---|---|---|---|
| 4,114,716 A * | 9/1978 | Sanders | 296/190.01 |
| 4,186,693 A * | 2/1980 | Thien et al. | 123/41.12 |
| 4,499,865 A | 2/1985 | Charles | |
| 4,632,206 A * | 12/1986 | Morinaka et al. | 180/229 |
| 4,757,858 A * | 7/1988 | Miller et al. | 165/41 |
| 5,046,550 A | 9/1991 | Boll et al. | |
| 5,373,892 A * | 12/1994 | Johnson et al. | 165/41 |
| 5,715,778 A * | 2/1998 | Hasumi et al. | 123/41.51 |
| 5,915,490 A * | 6/1999 | Wurfel | 180/68.1 |
| 5,992,554 A * | 11/1999 | Hasumi et al. | 180/229 |
| 6,332,505 B1 * | 12/2001 | Tateshima et al. | 180/229 |
| 6,382,144 B1 * | 5/2002 | Schneider | 123/41.29 |
| 6,422,182 B1 * | 7/2002 | Ohta | 123/41.29 |
| 6,435,295 B1 | 8/2002 | Weigele et al. | |
| 6,951,240 B2 * | 10/2005 | Kolb | 165/42 |

(Continued)

FOREIGN PATENT DOCUMENTS

| | | |
|---|---|---|
| DE | 2737595 A1 | 3/1979 |
| DE | 3804365 A1 | 3/1989 |

(Continued)

OTHER PUBLICATIONS

German Patent Office, German Search Report for German Application No. 102010010398.5, Feb. 3, 2011.

(Continued)

*Primary Examiner* — Hau Phan
*Assistant Examiner* — Jacob Meyer
(74) *Attorney, Agent, or Firm* — Ingrassia Fisher & Lorenz, P.C.

(57) ABSTRACT

A forward structure of a motor vehicle is provided that includes, but is not limited to a drive unit and a radiator arrangement for releasing the heat of the drive unit into the environment. The radiator arrangement encompasses at least two cooling unit, which are spatially separated from one another and which are arranged so as to overlap at least area by area in cross direction of the motor vehicle. An imaginary connecting line between the cooling units crosses at least one component of the drive unit.

20 Claims, 2 Drawing Sheets

(56) References Cited

U.S. PATENT DOCUMENTS

| | | | |
|---|---|---|---|
| 7,404,463 B2* | 7/2008 | Saiki et al. | 180/68.4 |
| 7,455,136 B2* | 11/2008 | Pleune et al. | 180/68.1 |
| 7,464,781 B2* | 12/2008 | Guay et al. | 180/68.4 |
| 7,523,798 B2 | 4/2009 | Muramatsu et al. | |
| 7,886,859 B2* | 2/2011 | Caldirola | 180/68.2 |
| 7,918,297 B2* | 4/2011 | Schneider | 180/68.4 |
| 7,921,947 B2* | 4/2011 | Horii et al. | 180/65.31 |
| 2003/0150408 A1 | 8/2003 | Roithinger | |
| 2004/0106027 A1 | 6/2004 | Imaseki et al. | |
| 2005/0217909 A1* | 10/2005 | Guay et al. | 180/68.4 |
| 2006/0048984 A1* | 3/2006 | Pleune et al. | 180/68.4 |
| 2006/0065455 A1* | 3/2006 | Saiki et al. | 180/68.4 |
| 2009/0000837 A1* | 1/2009 | Horii et al. | 180/65.3 |
| 2009/0159021 A1* | 6/2009 | Kardos | 123/41.12 |
| 2009/0266508 A1* | 10/2009 | Furuta | 165/44 |
| 2010/0089088 A1* | 4/2010 | Kardos et al. | 62/323.1 |

FOREIGN PATENT DOCUMENTS

| | | |
|---|---|---|
| DE | 68902232 T2 | 12/1992 |
| DE | 19849619 A1 | 5/2000 |
| DE | 199230968 A1 | 11/2000 |
| DE | 10021419 A1 | 11/2001 |
| DE | 102004005592 A1 | 8/2005 |
| DE | 102004034313 A1 | 2/2006 |
| DE | 102004050436 A1 | 4/2006 |
| DE | 102005043081 A1 | 3/2007 |
| DE | 102007028312 A1 | 12/2008 |
| DE | 102009031311 A1 | 1/2010 |
| EP | 0417500 A2 | 3/1991 |
| EP | 1083072 A1 | 3/2001 |
| EP | 1645451 A1 | 4/2006 |
| GB | 882434 A | 11/1961 |
| GB | 2002704 A | 2/1979 |
| JP | 59140124 A | 8/1984 |
| JP | 6328952 A | 11/1994 |
| JP | 2008273244 A | 11/2008 |
| WO | 2005075236 A1 | 8/2005 |
| WO | 2007007184 A1 | 1/2007 |
| WO | 2008111906 A1 | 9/2008 |

OTHER PUBLICATIONS

British Patent Office, British Search Report for Application No. 1103248.9, dated Jun. 22, 2011.

* cited by examiner

FORWARD STRUCTURE OF A MOTOR VEHICLE

CROSS-REFERENCE TO RELATED APPLICATION

This application claims priority to German Patent Application No. 102010010398.5, filed Mar. 5, 2010, which is incorporated herein by reference in its entirety.

TECHNICAL FIELD

The technical field related to a forward structure of a motor vehicle and in particular to the distribution of the installation space of the motor vehicle engine compartment as well as to a radiator arrangement designed for this.

BACKGROUND

Modern motor vehicles and motor vehicle concepts are aimed at a reduction of the motor vehicle weight as well as at a reduction of exhaust gases and of the fuel consumption. It thereby seems to be increasingly attractive for compact vehicles to provide for drive units, which encompass an internal combustion engine, which is coupled to a turbo charger. As compared to a common internal combustion engine, it is hereby possible to reduce capacity and weight as well as the installation space required for the internal combustion engine.

An internal combustion engine, which is dimensioned in a correspondingly small manner, could further still satisfy the demanded performance expectations by coupling it to a turbo charger. To attain a vehicle length, which is as small as possible, it is furthermore desirable for compact vehicles to embody the vehicle overhang located in front of a front axle to be as short as possible. In particular, it already proves to be difficult in the case of such compact vehicles to accommodate a cooling arrangement in the engine compartment. Typically, the individual heat exchangers of a radiator arrangement, such as water radiator and the compressor of an air conditioning unit for example, are embodied as a structural unit, wherein individual heat exchangers are arranged behind one another in the engine compartment, viewed in longitudinal direction of the vehicle, and are provided with a fan, which is located downstream from or upstream of said structural unit.

In the case of known compact vehicles, such conventional radiator arrangements are always arranged upstream of the drive unit of the vehicle. The construction depth of the individual heat exchangers as well as of the fan thus inevitably contributes to the vehicle overhang, which projects forward. In the event that the internal combustion engine is additionally coupled to a turbo charger, this turbo charger must preferably be arranged upstream of the internal combustion engine in driving direction of the vehicle, in particular in the case of compact vehicles. A further increasing vehicle overhang would be the result.

A radiator arrangement for a motor vehicle is known, for example, from DE 10 2004 005 592 B4, wherein the radiator extends at least partially in a space above the engine and below the engine hood. Such a radiator arrangement, however, is associated with an increase of the overall height of the engine compartment.

Contrary to this, it is at least one object to provide for a forward structure as well as for a radiator arrangement of a motor vehicle, which maximally utilizes the available installation space in the engine area, in particular in the case of compact motor vehicles. The forward structure and the radiator arrangement, which is to be accommodated therein, are thereby provided for the smallest possible vehicle front overhang. In addition, other objects, desirable features and characteristics will become apparent from the subsequent summary and detailed description, and the appended claims, taken in conjunction with the accompanying drawings and this background.

SUMMARY

The forward structure encompasses a drive unit and a radiator arrangement. The radiator arrangement is designed to release the heat of the drive unit into the environment. The radiator arrangement, which is thermally coupled to the drive unit, encompasses two cooling units, which are spatially separated from one another, that is, structurally separated, and which are arranged so as to overlap at least area by area in cross direction of the vehicle.

The cooling units are thereby arranged in the area of the front of the vehicle such that an imaginary connecting line between the cooling units crosses or intersects at least one component of the drive unit. Provision is made according to the invention to divide a cooling unit of a motor vehicle into at least two cooling units, wherein both cooling units can provide cooling capacities, which are comparable to one another, with reference to the release of engine heat. For instance, an arrangement is provided for cooling units and engine or drive components, respectively, which are nested into one another.

By means of the nested arrangement of cooling units and drive components, the installation space available in the engine compartment can be used more efficiently and the vehicle overhang can finally be reduced in an advantageous manner, because the cooling units are no longer arranged in the engine compartment so as to be located completely upstream of the drive unit. For instance, provision can in particular be made for the at least two cooling units to be separated from one another in cross direction of the vehicle and to arrange them in each case to be offset towards the drive unit with a certain overlapping area.

According to an embodiment, provision is made for each of the at least two cooling units to encompass at least one heat exchanger, to which cooling air, which is supplied externally, can be applied. This means that each of the two cooling units serve to directly release engine heat into the environment. Provision can furthermore be made for the cooling units and/or their heat exchangers to be arranged in a projection in vertical direction of the vehicle relative to one another so as to overlap at least area by area or completely. Provision is advantageously made hereby for the cooling units to maximally encompass an overall height, which is comparable to the drive unit and to also be positioned approximately at the same height of the drive unit in the engine compartment.

Through this, a pipework of the heat exchangers among one another as well as to the drive unit can be embodied so as to be relatively short. In addition, the cooling units do not contribute or contribute only insignificantly to the vertical expansion of the engine compartment in the case of such an arrangement. The engine compartment is thus preferably specified solely by the overall size of the drive unit, while the cooling units and in particular the heat exchangers thereof are adapted to the remaining installation space so as to be as space-saving as possible.

According to a further embodiment, each of the at least two cooling units has its own fan. The fan can thereby be arranged so as to be upstream of or downstream from the respective heat exchangers in driving direction. Depending on the installation situation, the fan is then accordingly embodied as pusher or extractor fan. In that each cooling unit is assigned its own fan, cooling air can also be applied variably to the respective heat exchangers of the cooling units independent on one another so as to be adapted to the respective situation. Provision is thus in particular made according to the invention for the heat exchangers, namely water radiators, compressor of an air conditioning unit, intercooler and/or oil cooler, which must typically be arranged in an engine compartment of a motor vehicle, to be distributed to the different cooling units, which are arranged spaced apart from one another.

The respective heat exchangers can thereby be planned and designed with reference to their cooling capacity such that none of the two fans must not yet be activated when driving in the average to high speed range, because the airflow provides for a sufficient supply of cooling air. Only in standstill or in response to driving in the lower speed range, provision is made for only one fan of a cooling unit to be activated and for both fans of the at least two cooling units having to be activated only for providing maximum cooling capacities. The division of the heat exchanges to the respective cooling units can thereby take place in consideration of this scenario.

According to a further embodiment, provision is made for the heat exchangers and/or the fans of different cooling units to be oriented relative substantially parallel under a predetermined angle. Provision can thus be made for the heat exchangers and the fans, which are assigned thereto, to be arranged as heat exchanger-fan-packets along the vehicle front and to accordingly be oriented in cross direction of the vehicle.

Provision is thereby in particular made for the heat exchangers to be subjected to the airflow of the vehicle with a cooling surface, which is as large as possible and which is provided with cooling fins. However, in addition to such an orientation in cross direction of the vehicle, provision can also be made for the cooling units, but at least the heat exchangers thereof, to be arranged under an angle to the longitudinal or cross direction of the vehicle. Provision can hereby in particular be made for air guiding devices, so that a corresponding cooling air flow can be branched off from the airflow as much as possible.

It is also possible to incline the heat exchangers and/or the assigned fans of at least one cooling unit about an imaginary pivot axis, which runs in horizontal direction. An inclined arrangement of heat exchangers or cooling units, respectively, which is inclined in such a manner, can similarly be advantageous for an optimal use of installation space.

In a further embodiment, a forward structure is provided for a motor vehicle. At least one component of at least one of the cooling units, to which cooling air can be applied directly, viewed in cross direction of the motor vehicle, is arranged so as to overlap at least area by area with at least one component of the drive unit. Provision is thereby made, for example, for an end section of a cooling unit, which is located in the rear in driving direction, to be located downstream from an end of the driving unit, which is located in the front in driving direction. A nested arrangement of drive unit and a heat exchanger or a fan of a cooling unit, respectively, can thus be created.

Provision is furthermore made for at least one component of the drive unit, viewed in cross direction of the vehicle, to come to rest between the at least two cooling units of the cooling arrangement at least area by area. Preferably, the at least two cooling units are arranged on the side of a center section of the drive unit and are located upstream of the drive unit at least area by area.

In a further embodiment, at least one heat exchanger, viewed in vertical direction of the vehicle, is arranged so as to overlap at least area by area with a bumper cross beam, which is located upstream of the drive unit. The heat exchanger can thereby be adapted to the installation space, which directly adjoins the bumper cross beam. It is hereby possible, in particular, to provide the installation space located in the bumper cross beam plane above and/or below, with a heat exchanger or with a radiator, respectively.

According to a further embodiment, provision is at least made for one heat exchange of the radiator arrangement, viewed in vertical vehicle direction, to be arranged so as to overlap at least area by area with a turbo charger, with said turbo charger being located upstream of an internal combustion engine. Provision can hereby likewise be made for the heat exchanger, also viewed in cross direction of the vehicle, to be arranged so as to overlap at least area by area with the turbo charger. By means of this alternating overlapping arrangement of turbo charger and at least one cooling unit, viewed in vertical or cross direction of the vehicle, the front overhang of the motor vehicle can be minimized despite a turbo charger, which projects forward from an engine block, namely when components of at least one cooling unit are arranged on the side of and/or vertically offset to the turbo charger at least area by area.

According to a further embodiment, provision is made for at least two cooling units to each encompass a water radiator, wherein the water radiators are in fluid connection with one another, or are thermally coupled to the drive unit independent on one another. Due to the fact that the water radiator, which is in particular provided for engine cooling, assumes a comparatively large installation space due to the cooling capacity, which is to be provided, said water radiator can be distributed in a functional manner to two or more cooling units according to the invention for the purpose of optimizing the installation space and/or for the optimized use of installation space.

Depending on the equipping of the respective cooling units with further heat exchangers, for instance an air conditioning unit compressor, an intercooler and/or an oil cooler, both water radiators can be adapted either mostly identically or to installation space or radiator-specific requirements with reference to their size.

Provision is made for at least one water radiator, one compressor of a vehicle air conditioning unit, an oil cooler and/or an intercooler as heat exchanger of the cooling units.

A radiator arrangement is provided for an afore-described forward structure of a motor vehicle. The radiator arrangement hereby encompasses at least two cooling units, which are embodied so as to be spatially separated from one another and so as to be arranged so as to overlap at least area by area in cross direction of the vehicle, wherein the cooling units are arranged and/or oriented relative to one another and to the drive unit of the forward structure of the motor vehicle such that an imaginary connecting line between the cooling units crosses at least one component of the drive unit.

In addition, a motor vehicle is provided that comprises a forward structure or a radiator arrangement, respectively. Provision is hereby made in particular for the motor vehicle to encompass an internal combustion engine, to which a turbo charger, which is located upstream thereof in driving direction of the vehicle, is assigned or arranged thereon, respectively.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
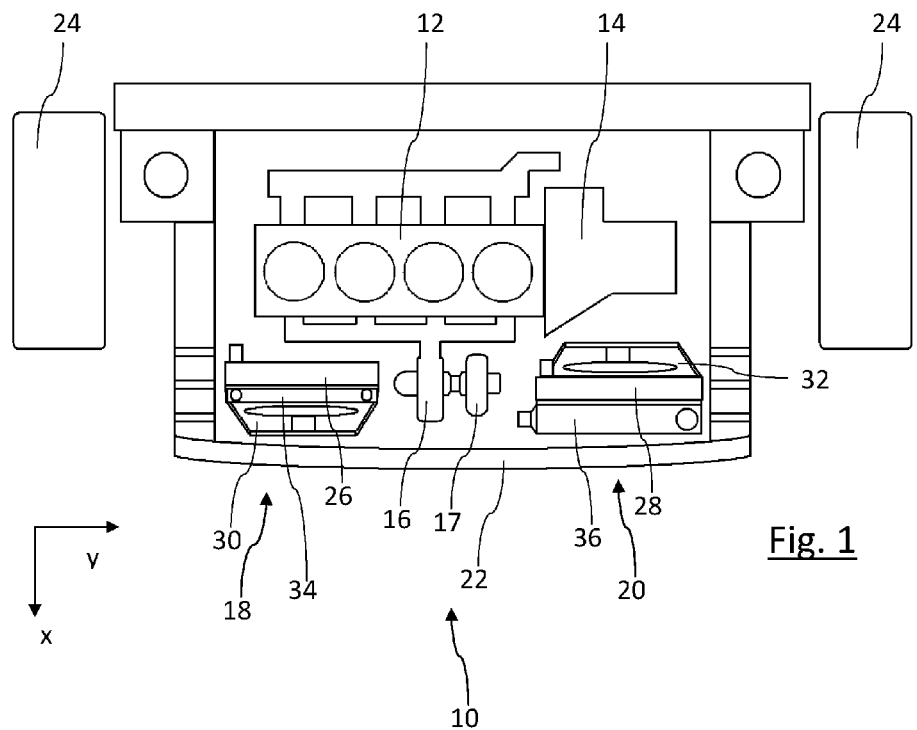
FIG. 1 shows a schematic illustration of a first embodiment of a forward structure.

The following detailed description is merely exemplary in nature and is not intended to limit application and uses. Furthermore, there is no intention to be bound by any theory presented in the preceding background or summary or the following detailed description.

The exemplary embodiments of a motor vehicle forward structure shown in FIG. 1 to FIG. 4 in each case show different cooling arrangements 10, which, however, always encompass at least two cooling units or cooling components 18, 20, 21, which are arranged so as to be spatially separated from one another. An internal combustion engine 12 and a transmission system 14 are arranged in the area of the engine compartment. The two front wheels 24 of the motor vehicle are furthermore indicated in all of FIG. 1 to FIG. 4. Provision is made at the engine 12 itself for a turbo charger 16, which projects forward in driving direction and the forward structure is limited by means of a bumper cross beam 22 in driving direction.

The diverse cooling units 18, 20, 21 are arranged predominantly in the installation space, which is limited between the engine 12, turbo charger 16 and bumper cross beam 22 in all of the embodiments of FIG. 1 to FIG. 4.

Figure 4:
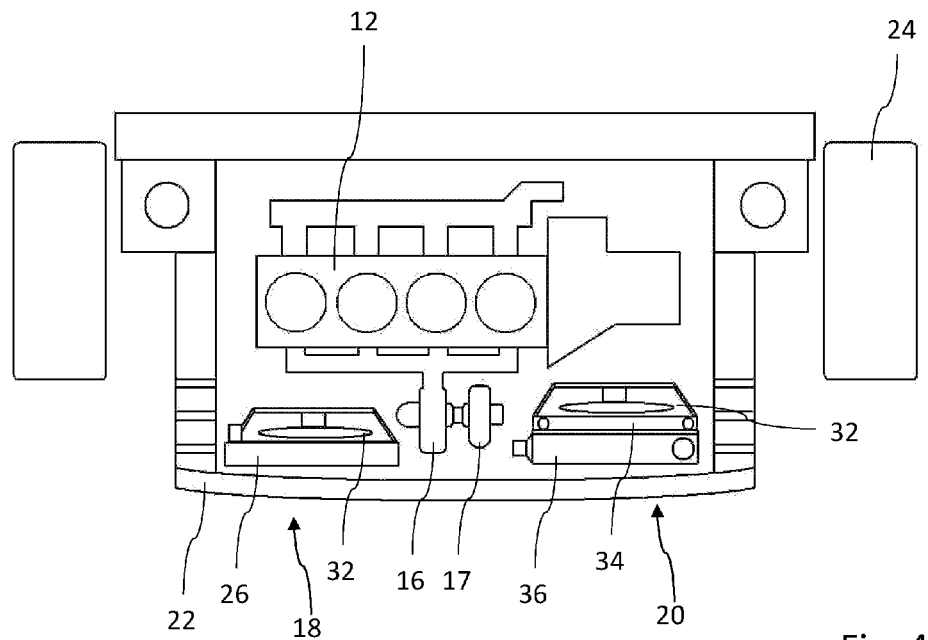
FIG. 4 shows a fourth embodiment alternative of the forward structure.

Provision is hereby in particular made for the turbo charger 16, which projects forward from the engine 12, to virtually adjoin the bumper cross beam 22 in driving direction (x). The radiator arrangement is hereby arranged on the side of the turbo charger 16 by means of its cooling units 18, 20, which are illustrated in FIG. 1, FIG. 2 and FIG. 4.

An imaginary connecting line between the cooling units 18, 20, which are arranged so as to be spatially separated from one another, thus crosses a component of the drive unit, the turbo charger 16 in the instant case. In addition, the cooling units 18, 20, viewed in cross direction of the vehicle (y), are arranged so as to overlap at least area by area with at least one drive component, namely the turbo charger 16.

The equipping and configuration of the individual cooling units 18, 20, 21 can have any variation in the manner illustrated in FIG. 1 to FIG. 4.

Figure 2:
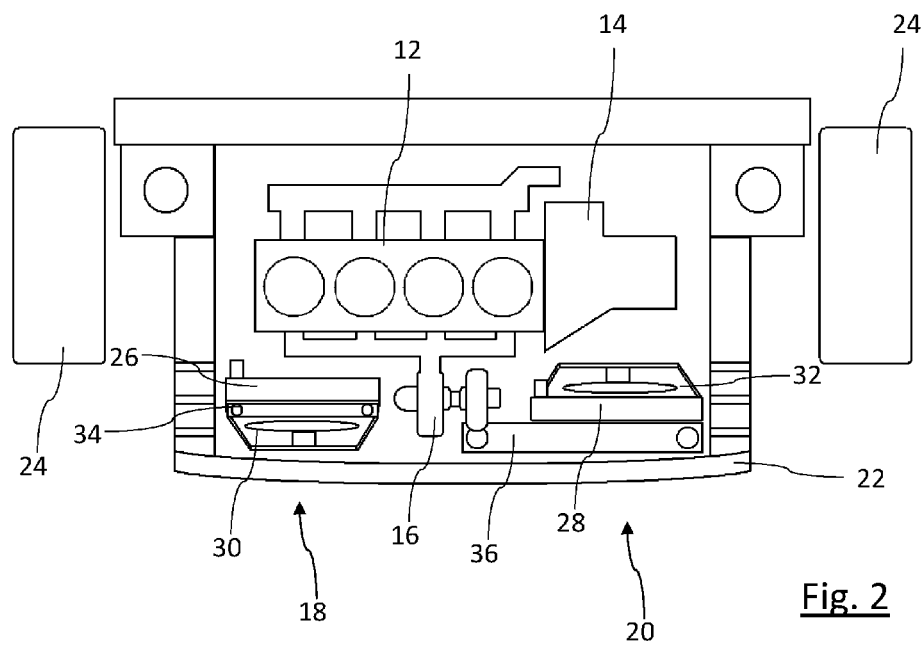
FIG. 2 shows a second embodiment of the forward structure.

For example, provision is made in FIG. 1 to provide the cooling unit 18, which is arranged to the left of the turbo charger 16, with a water radiator 26 as well as with a compressor 34 of an air conditioning unit, wherein water radiator 26 and compressor 34 are arranged relative to one another in a sandwich construction and are provided with a pusher fan 30 as integrated structural unit.

The other cooling unit 20, which is arranged to the right, encompasses a further water radiator 28 as well as an intercooler 36 for the turbo charger 16. Instead of a pusher fan, provision is made in the case of this cooling unit 20 for an extractor fan 32, which is arranged so as to be located downstream from the two heat exchangers 28, 36 in driving direction.

In the exemplary embodiment according to FIG. 1, the water radiator device provided for the cooling of the internal combustion engine 12 is divided into two individual water radiators 26, 28, which are arranged separated from one another. The two water radiators 26, 28 can hereby be in connection with one another in a fluid-guiding manner.

In the alternative, it is possible for each of the two water radiators 26, 28 to be thermally coupled separately to the engine 12, wherein an individual thermal coupling to the engine 12 can in each case take place under different cooling capacity demands. The overall cooling capacity provided by the water radiators 26, 28 can hereby be variably adapted to the required cooling capacity of the radiator arrangement 10.

In the embodiment according to FIG. 2, provision is still made for two individual water radiators 26, 28. The embodiment according to FIG. 2 differs from the embodiment according to FIG. 1 in the geometric embodiment of the intercooler 36. As compared to the configuration according to FIG. 1, said intercooler is slightly wider in its construction. It hereby preferably extends above and/or below a suction area 17 of the turbo charger 16 at least area by area. Consequently, this heat exchanger 36 is arranged so as to overlap at least area by area with a component of the drive unit, in particular the turbo charger 16, 17, not only in cross direction of the vehicle, but also in vertical direction of the vehicle.

Such an overlapping arrangement of turbo chargers 16, 17 and intercooler 36 in cross direction of the vehicle (y) and/or in vertical direction of the vehicle (z) is advantageous with reference to the fluid-guiding connection of intercooler 36 and turbo charger 16, 17. The pressure losses caused by the intercooler can advantageously be minimized by means of a comparatively short connection of intercooler 36 and turbo chargers 16, 17.

Figure 3:
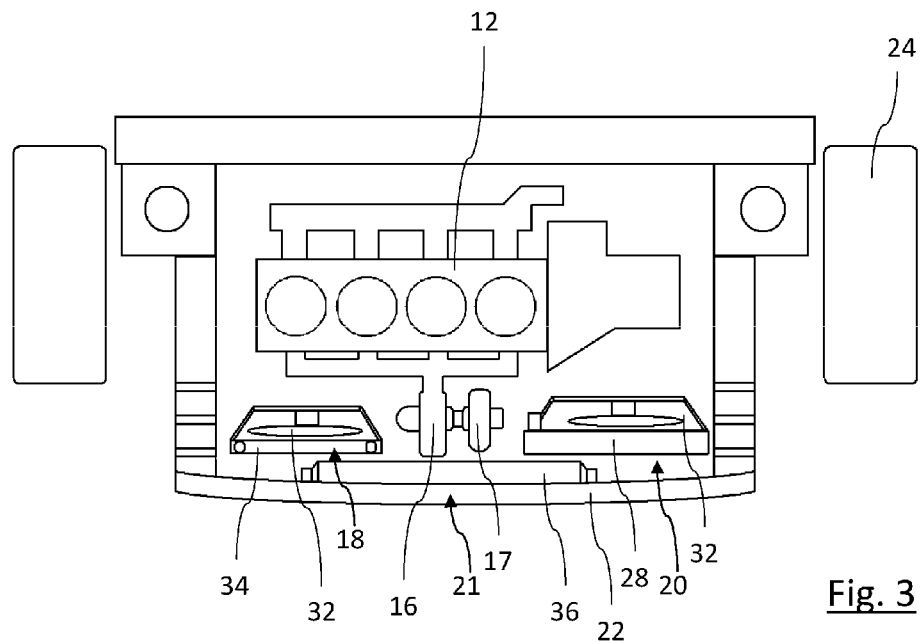
FIG. 3 shows a further embodiment of the forward structure.

FIG. 3 shows a further embodiment of a radiator arrangement or of a forward structure, respectively. The two cooling units 18, 20 are hereby also oriented substantially parallel and in cross direction of the vehicle to one another. While the cooling unit 18 only encompasses its own fan 32 and a compressor of the air conditioning unit 34, a water radiator 28 and an extractor fan 32 are provided for the cooling unit 20.

The intercooler 36 for the turbo charger 16 is thereby located upstream of the turbo charger in driving direction. It can be arranged directly on the bumper cross beam 22, for example, or can be fastened in the engine compartment in a different manner so as to approximately adjoin thereon.

In the embodiment according to FIG. 3, the intercooler 36, viewed in longitudinal direction of the vehicle, comes to rest so as to overlap area by area with the two lateral cooling units 18, 20. The intercooler 36 is hereby not equipped with a fan, which is provided particularly for this purpose. However, a cooling air supply, which is sufficient for the intercooler 36, can be provided by means of the overlapping area by area arrangement of the intercooler 20 with the cooling units 18, 20, which are arranged on the side of the turbo charger 16, 17, for instance also during the standstill of the vehicle.

The two cooling units 18, 20 and the intercooler 36, which acts as cooling unit 21, can hereby be coupled to one another in a fluidic manner by means of air guiding devices, such as air shields, for instance, so as to be able to provide for an optimized distribution of supplied cooling air to the individual cooling units 18, 20, 21.

FIG. 4 finally shows a fourth alternative of the forward structure according to the invention or of the radiator arrangement according to the invention, respectively. Contrary to the embodiment according to FIG. 1, provision is hereby made for two extractor fans 32 for the cooling units 18, 20, wherein the cooling unit 18 only encompasses one water radiator 26 as heat exchanger and the other cooling unit 20 couples an intercooler 36 to an air conditioning unit compressor. Cooling air can thereby be applied to the water radiator provided for cooling the engine 12 in a self-sufficient manner and independent on the two remaining heat exchangers 34, 36 with the help of the fan 32.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents

What is claimed is:

1. A forward structure of a motor vehicle comprising:
a bumper cross beam;
a drive unit comprising a turbo charger; and
a radiator arrangement configured to release heat of the drive unit into an environment, wherein the radiator arrangement, comprises:
a plurality of cooling units, the plurality of cooling units comprising:
a first cooling unit arranged in an installation space defined between the turbo charger and the bumper cross beam; and
a second cooling unit arranged in the installation space and spatially separated from the first cooling unit,
wherein the first cooling unit and the second cooling unit are arranged on opposite sides of the turbo charger and to overlap, in a cross direction of the motor vehicle, area-by-area,
wherein the turbo charger is disposed in between the first cooling unit and the second cooling unit such that an imaginary connecting line between the first cooling unit and the second cooling unit crosses the turbo charger.

2. The forward structure according to claim 1, further comprising:
an intercooler located within the installation space defined in the engine compartment.

3. The forward structure according to claim 1, wherein the first and second cooling units are arranged relative to one another in a projection in a vertical direction of the motor vehicle so as to overlap the at least area by area.

4. The forward structure according to claim 2, wherein the first cooling unit comprises: a first fan; and a first radiator integrated together with the first fan; and
wherein the second cooling unit comprises: a second fan.

5. The forward structure according to claim 1, wherein the first cooling unit comprises a first heat exchanger, and wherein the second cooling unit comprises a second heat exchanger, and wherein the first and second heat exchangers are oriented relative to one another substantially parallel.

6. The forward structure according to claim 4, wherein the first fan and the second fan are oriented relative to one another under a predetermined angle.

7. The forward structure according to claim 1, wherein the first and second cooling units are arranged so as to overlap the at least area by area with the turbo charger when viewed in cross direction of the motor vehicle.

8. The forward structure according to claim 1, wherein the turbo charger comes to rest between the first and second cooling units when viewed in cross direction of the motor vehicle.

9. The forward structure according to claim 2, wherein the intercooler is arranged so as to overlap the at least area by area with the bumper cross beam, which is located upstream of the drive unit, viewed in vertical direction of the motor vehicle.

10. The forward structure according to claim 2, wherein the driver unit further comprises:
an internal combustion engine coupled to the turbo charger, wherein the intercooler is arranged so as to overlap the at least area by area with the turbo charger, wherein the turbo charger is arranged upstream of the internal combustion engine viewed in cross direction of the motor vehicle.

11. A radiator arrangement for a forward structure of a motor vehicle having a turbo charger and a bumper cross beam and an installation space defined between the turbo charger and the bumper cross beam, the radiator arrangement comprising:
a first cooling unit arranged in the installation space; and
a second cooling unit arranged in the installation space and being spatially separated from the first cooling unit,
wherein the first cooling unit and the second cooling unit are arranged on opposite sides of the turbo charger and to overlap, in a cross-sectional direction of the motor vehicle, area-by-area with the turbo charger, and
wherein the turbo charger is disposed in between the first cooling unit and the second cooling unit such that an imaginary connecting line between the first cooling unit and the second cooling unit crosses the turbo charger.

12. A motor vehicle comprising:
a forward structure, comprising:
a bumper cross beam;
a drive unit arranged within an engine compartment, the drive unit comprising a plurality of components including at least: an engine and a turbo charger that is located upstream in a vehicle driving direction; and
a radiator arrangement configured to release heat of the drive unit into an environment, wherein the radiator arrangement encompasses a plurality of cooling units arranged in an installation space defined in the engine compartment between the engine, the turbo charger, and the bumper cross beam, the plurality of cooling units comprising:
a first cooling unit; and
a second cooling unit spatially separated from the first cooling unit, wherein the first cooling unit and the second cooling unit are arranged on opposite sides of the turbo charger and are arranged so as to overlap at least area by area in cross direction of the motor vehicle with the turbo charger, and
wherein the turbo charger is disposed in between the first cooling unit and the second cooling unit such that an imaginary connecting line between the first cooling unit and the second cooling unit crosses the turbo charger.

13. A motor vehicle comprising:
a bumper cross beam;
a drive unit disposed within an engine compartment, the drive unit comprising a plurality of components including at least: an engine having a turbo charger; and
a plurality of cooling units arranged in an installation space defined in the engine compartment between the engine, the turbo charger, and the bumper cross beam, the plurality of cooling units comprising:
a first cooling unit; and
a second cooling unit spatially separated from the first cooling unit,
wherein the first cooling unit and the second cooling unit are arranged on opposite sides of the turbo charger and to overlap, in a cross-sectional direction of the motor vehicle, area-by-area with the turbo charger, wherein the turbo charger is disposed in between the first cooling unit and the second cooling unit such that an imaginary connecting line between the first cooling unit and the second cooling unit crosses the turbo charger.

14. The motor vehicle according to claim 13, further comprising:

an intercooler located within the installation space defined in the engine compartment.

15. The motor vehicle according to claim 14, wherein the first cooling unit comprises: a first fan; and a first radiator integrated together with the first fan; and wherein the second cooling unit comprises: a second fan.

16. The motor vehicle according to claim 15, wherein the plurality of cooling units further comprise:

a third cooling unit comprising the intercooler, wherein the intercooler is located upstream of the turbo charger in the driving direction of the motor vehicle, and overlaps with the first cooling unit and the second cooling unit.

17. The motor vehicle according to claim 15, wherein the second cooling unit further comprises:

a second radiator integrated together with the second fan.

18. The motor vehicle according to claim 15, wherein the first cooling unit further comprises:

a compressor integrated together with the first fan.

19. The motor vehicle according to claim 15, wherein the second cooling unit further comprises:

the intercooler integrated together with the second fan.

20. The motor vehicle according to claim 19, wherein the second cooling unit further comprises:

a compressor integrated together with the second fan.

* * * * *